United States Patent
Baumann

(10) Patent No.: US 9,188,986 B2
(45) Date of Patent: Nov. 17, 2015

(54) COMPUTER-IMPLEMENTED METHOD AND SYSTEM FOR DYNAMICALLY POSITIONING A VEHICLE RELATIVE TO ANOTHER VEHICLE IN MOTION FOR ON-THE-FLY OFFLOADING OPERATIONS

(71) Applicant: Jaybridge Robotics, Inc., Cambridge, MA (US)

(72) Inventor: William P. Baumann, Cambridge, MA (US)

(73) Assignee: Jaybridge Robotics, Inc., Cambridge, MA (US)

( * ) Notice: Subject to any disclaimer, the term of this patent is extended or adjusted under 35 U.S.C. 154(b) by 0 days.

(21) Appl. No.: 14/043,433

(22) Filed: Oct. 1, 2013

(65) Prior Publication Data

US 2015/0094944 A1    Apr. 2, 2015

(51) Int. Cl.
*G05D 1/02* (2006.01)
*A01B 69/00* (2006.01)

(52) U.S. Cl.
CPC .............. *G05D 1/0289* (2013.01); *A01B 69/00* (2013.01); *G05D 1/0278* (2013.01); *G05D 2201/0201* (2013.01)

(58) Field of Classification Search
CPC . G05D 1/0289; G05D 1/0293; G05D 1/0295; G05D 2201/0201; G05D 1/0272; G05D 1/0291; G01S 19/40; G01S 2013/9325; G01S 2013/9342; G01S 2013/9346; G01S 5/0284; A01B 69/008; A01B 79/005; A01B 69/004; A01B 69/007; A01B 15/20; E02F 9/2045; A01D 41/1278

USPC ......... 701/25, 26, 2, 408, 300, 96; 56/10.2 R, 56/10.8, 10.1; 340/435; 414/373, 809; 700/245, 255

See application file for complete search history.

(56) References Cited

U.S. PATENT DOCUMENTS

| | | |
|---|---|---|
| 3,429,062 A | 2/1969 | Nelson |
| 3,889,796 A | 6/1975 | Baily et al. |
| 5,204,814 A | 4/1993 | Noonan et al. |
| 5,684,476 A | 11/1997 | Anderson |
| 5,987,383 A | 11/1999 | Keller et al. |
| 6,076,025 A | 6/2000 | Ueno et al. |
| 6,088,644 A | 7/2000 | Brandt et al. |
| 6,141,614 A | 10/2000 | Janzen et al. |

(Continued)

OTHER PUBLICATIONS

International Search Report and Written Opinion for PCT/US2014/058590, dated Dec. 30, 2014.

*Primary Examiner* — Marthe Marc-Coleman
(74) *Attorney, Agent, or Firm* — Rajesh Vallabh; Foley Hoag LLP

(57) ABSTRACT

Computer-implemented methods and systems are disclosed for automatically positioning a moving first vehicle relative to a moving second vehicle traveling in a given area. The method includes the steps of: (a) tracking the second vehicle and guiding the first vehicle to attain a given position relative to the second vehicle; and (b) controlling the first vehicle to maintain a generally constant speed such that an operator of the second vehicle can adjust the speed of the second vehicle to correspondingly adjust a relative position of the second vehicle to the first vehicle in a direction of movement of the first and second vehicles, and controlling the first vehicle to maintain a given distance from the second vehicle in a direction generally perpendicular to the direction of movement of the first and second vehicles by tracking the second vehicle.

36 Claims, 8 Drawing Sheets

(56) References Cited

U.S. PATENT DOCUMENTS

| | | | |
|---|---|---|---|
| 6,151,539 | A | 11/2000 | Bergholz et al. |
| 6,205,381 | B1 | 3/2001 | Motz et al. |
| 6,377,889 | B1 | 4/2002 | Soest |
| 6,431,576 | B1 | 8/2002 | Viaud et al. |
| 6,434,462 | B1 | 8/2002 | Bevly et al. |
| 6,501,422 | B1 | 12/2002 | Nichols |
| 6,539,303 | B2 | 3/2003 | McClure et al. |
| 6,615,108 | B1 | 9/2003 | Peless et al. |
| 6,643,576 | B1 | 11/2003 | O Connor et al. |
| 6,703,973 | B1 | 3/2004 | Nichols |
| 6,804,587 | B1 | 10/2004 | O Connor et al. |
| 6,804,597 | B1 | 10/2004 | Posselius et al. |
| 6,865,465 | B2 | 3/2005 | McClure |
| 6,885,912 | B2 | 4/2005 | Peless et al. |
| 6,907,336 | B2 | 6/2005 | Gray et al. |
| 6,990,399 | B2 | 1/2006 | Hrazdera et al. |
| 7,010,425 | B2 | 3/2006 | Gray et al. |
| 7,054,731 | B1 | 5/2006 | Lange et al. |
| 7,100,725 | B2 | 9/2006 | Thorne |
| 7,142,956 | B2 | 11/2006 | Heiniger et al. |
| 7,155,309 | B2 | 12/2006 | Peless et al. |
| 7,162,348 | B2 | 1/2007 | McClure et al. |
| 7,173,391 | B2 | 2/2007 | Jones et al. |
| 7,188,015 | B2 | 3/2007 | Lange et al. |
| 7,191,061 | B2 | 3/2007 | McKay et al. |
| 7,228,214 | B2 | 6/2007 | Flann et al. |
| 7,256,388 | B2 | 8/2007 | Eglington et al. |
| 7,263,422 | B2 | 8/2007 | Lange et al. |
| 7,317,977 | B2 | 1/2008 | Matrosov |
| 7,349,759 | B2 | 3/2008 | Peless et al. |
| 7,350,343 | B2 | 4/2008 | Beck |
| 7,363,154 | B2 | 4/2008 | Lindores |
| 7,373,231 | B2 | 5/2008 | McClure et al. |
| 7,383,114 | B1 | 6/2008 | Lange et al. |
| 7,388,343 | B2 | 6/2008 | Jones et al. |
| 7,429,843 | B2 | 9/2008 | Jones et al. |
| 7,431,115 | B2 | 10/2008 | Thorne |
| 7,437,230 | B2 | 10/2008 | McClure et al. |
| 7,451,030 | B2 | 11/2008 | Eglington et al. |
| 7,490,678 | B2 | 2/2009 | Unruh et al. |
| 7,502,678 | B2 | 3/2009 | Diekhans et al. |
| 7,509,199 | B2 | 3/2009 | Rekow |
| 7,580,783 | B2 | 8/2009 | Dix |
| 7,593,798 | B2 | 9/2009 | Han et al. |
| 7,623,952 | B2 | 11/2009 | Unruh et al. |
| 7,689,354 | B2 | 3/2010 | Heiniger et al. |
| 7,689,356 | B2 | 3/2010 | Dix et al. |
| 7,693,653 | B2 | 4/2010 | Hussain et al. |
| 7,706,948 | B2 | 4/2010 | Dix et al. |
| 7,715,966 | B2 | 5/2010 | Dix et al. |
| 7,715,979 | B2 | 5/2010 | Dix |
| 7,729,834 | B2 | 6/2010 | Meyer Zu Helligen et al. |
| 7,734,387 | B1 | 6/2010 | Young et al. |
| 7,737,878 | B2 | 6/2010 | van Tooren et al. |
| 7,742,860 | B2 | 6/2010 | Diekhans et al. |
| 7,747,370 | B2 | 6/2010 | Dix |
| 7,756,624 | B2 | 7/2010 | Diekhans et al. |
| 7,818,120 | B2 | 10/2010 | Poreda et al. |
| 7,835,832 | B2 | 11/2010 | Macdonald et al. |
| 7,844,378 | B2 | 11/2010 | Lange |
| 7,844,380 | B2 | 11/2010 | Han et al. |
| 7,860,628 | B2 | 12/2010 | Lange |
| 7,873,437 | B2 | 1/2011 | Aldred et al. |
| 7,877,182 | B2 | 1/2011 | Dix et al. |
| 8,126,620 | B2 | 2/2012 | Ringwald et al. |
| 8,132,659 | B2 | 3/2012 | Coers et al. |
| 8,186,497 | B2 | 5/2012 | Mackin et al. |
| 2002/0082757 | A1* | 6/2002 | Behnke .......................... 701/50 |
| 2003/0145571 | A1 | 8/2003 | Diekhans |
| 2006/0047418 | A1* | 3/2006 | Metzler et al. ................. 701/207 |
| 2006/0175541 | A1 | 8/2006 | Eglington et al. |
| 2006/0178820 | A1 | 8/2006 | Eglington et al. |
| 2006/0178823 | A1 | 8/2006 | Eglington et al. |
| 2006/0178825 | A1 | 8/2006 | Eglington et al. |
| 2007/0233374 | A1 | 10/2007 | Diekhans et al. |
| 2008/0306628 | A1 | 12/2008 | Ng-Thow-Hing et al. |
| 2009/0099775 | A1 | 4/2009 | Mott et al. |
| 2010/0066517 | A1 | 3/2010 | Posselius et al. |
| 2010/0174435 | A1 | 7/2010 | Lim |
| 2010/0274452 | A1 | 10/2010 | Ringwald et al. |
| 2010/0292835 | A1 | 11/2010 | Sugiura et al. |
| 2011/0035050 | A1 | 2/2011 | Kim et al. |
| 2011/0035051 | A1 | 2/2011 | Kim et al. |
| 2012/0096824 | A1 | 4/2012 | Burger |
| 2012/0215394 | A1 | 8/2012 | Wang et al. |
| 2012/0215409 | A1 | 8/2012 | Wang et al. |
| 2012/0302299 | A1 | 11/2012 | Behnke et al. |
| 2013/0213518 | A1 | 8/2013 | Bonefas |

* cited by examiner

COMPUTER-IMPLEMENTED METHOD AND SYSTEM FOR DYNAMICALLY POSITIONING A VEHICLE RELATIVE TO ANOTHER VEHICLE IN MOTION FOR ON-THE-FLY OFFLOADING OPERATIONS

BACKGROUND

The present application relates generally to automatically driven vehicles and, more specifically, to computer-implemented methods and systems for automatically driving and dynamically positioning a vehicle relative to another in motion, particularly for on-the-fly offloading of material from one vehicle to the other.

BRIEF SUMMARY OF THE DISCLOSURE

In accordance with one or more embodiments, a computer-implemented method is provided for automatically positioning a moving first vehicle relative to a moving second vehicle traveling in a given area. The method includes the steps of: (a) tracking the second vehicle and guiding the first vehicle to attain a given position relative to the second vehicle; and (b) once the first vehicle has attained the given position relative to the second vehicle, controlling the first vehicle to maintain a generally constant speed such that an operator of the second vehicle can adjust the speed of the second vehicle to correspondingly adjust a relative position of the second vehicle to the first vehicle in a direction of movement of the first and second vehicles, while controlling the first vehicle to maintain a given distance from the second vehicle in a direction generally perpendicular to the direction of movement of the first and second vehicles by tracking the second vehicle.

In accordance with one or more further embodiments, a first vehicle is configured to be automatically positioned relative to a moving second vehicle traveling in a given area. The first vehicle includes (a) a vehicle drive system, (b) a vehicle state property estimation system for estimating state properties of the first vehicle, and (c) a microprocessor-based vehicle controller receiving data from the vehicle state property estimation system and controlling the vehicle drive system. The vehicle controller is configured to: (i) track the second vehicle and control the vehicle drive system to guide the first vehicle to attain a given position relative to the second vehicle; and (ii) once the first vehicle has attained the given position relative to the second vehicle, control the vehicle drive system to maintain a generally constant speed such that an operator of the second vehicle can adjust the speed of the second vehicle to correspondingly adjust a relative position of the second vehicle to the first vehicle in a direction of movement of the first and second vehicles, and control the vehicle drive system such that the first vehicle maintains a given distance from the second vehicle in a direction generally perpendicular to the direction of movement of the first and second vehicles by tracking the second vehicle.

DETAILED DESCRIPTION

U.S. patent application Ser. No. 13/281,012 entitled METHOD AND SYSTEM FOR DYNAMICALLY POSITIONING A VEHICLE RELATIVE TO ANOTHER VEHICLE IN MOTION, which is incorporated by reference herein, discloses methods and systems for automatically driving and dynamically positioning a vehicle (referred to herein as a "first" vehicle) relative to another moving vehicle (referred to herein as a "second" vehicle). The first vehicle may be towing a conveyance, and it is controlled such that the conveyance is positioned accurately relative to the second vehicle, while the vehicles are in motion. The first vehicle may be controlled to move between a given location such as a designated parking area and a given position relative to the second vehicle. A vehicle controller controls the speed and steering of the first vehicle in order to maneuver it to and to maintain a spatial relationship between the vehicles.

Figure 1:
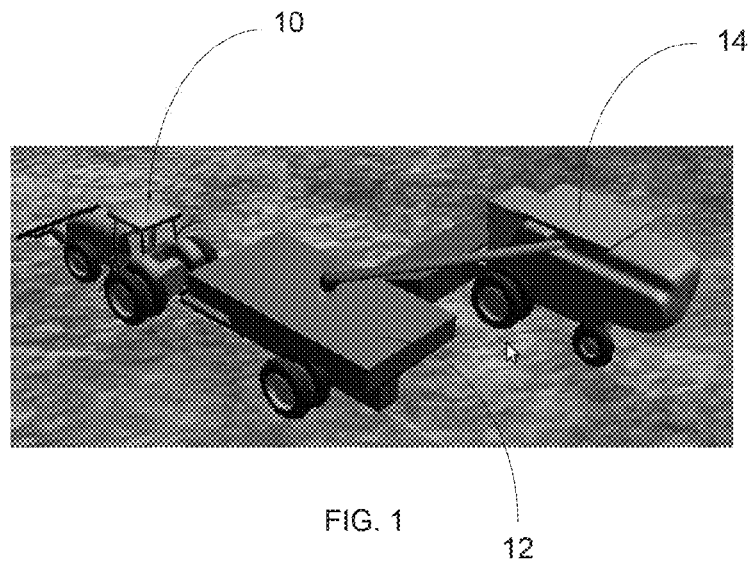
FIG. 1 is an illustration showing an exemplary tractor maintaining a given position relative to a harvester for an on-the-fly offloading operation.

Such methods and systems can have a variety of applications including, e.g., agricultural applications. By way of example, as shown in FIG. 1, the first vehicle is an automatically driven tractor 10, the towed conveyance is a grain cart 12, and the second vehicle is a harvester 14, which offloads harvested product onto the grain cart. The second vehicle is referred to as the "Offloader," and the first vehicle and cart are referred to as the "Receiver." The parking area contains a semi truck, into which the grain cart 12 is offloaded after having been filled by the harvester 14. In this example, the harvester 14 offloads harvested corn, soy, or other product or material into the grain cart 12 using the harvester's offloading spout, as the grain cart 12 is towed alongside the harvester 14 by the tractor 10. After the grain cart 12 has been filled, the tractor 10 tows it to the parking area to be offloaded into the semi truck. After the grain cart 12 has been emptied, the tractor 10 tows it back out to the harvester 14, which has remained in motion and in operation, to begin taking offloaded product again.

The process of offloading material from the harvester 14 to the grain cart 12 while the vehicles are in motion is referred to as offloading on-the-fly. Offloading on-the-fly can occur while the Offloader is continuously engaged in performing another task. As the combine harvester in the FIG. 1 example empties itself into the grain cart, it continues to move forward to harvest grain.

In one or more embodiments, the tractor is an autonomous vehicle and the harvester is manually operated by a human driver. Alternately, the harvester can be tele-operated (i.e., remotely operated) by a human outside the vehicle or it can be driven entirely automatically.

For simplicity, various exemplary embodiments disclosed herein refer to the grain cart example. However, it should be understood that there are many other possible applications for the methods and systems described herein, including agricultural and non-agricultural applications. Other possible applications can include, but are not limited to, mining, oil and gas exploration, defense, first response, and materials handling.

Various embodiments disclosed herein discuss the positioning of the towed conveyance 12 relative to the second vehicle 14. However, techniques disclosed herein are also applicable to the case where the second vehicle 14 is also towing a conveyance, and the dynamic positioning of the first conveyance is relative to the second conveyance. In some embodiments, the second vehicle 14 can tow a conveyance, and the dynamic positioning of the first vehicle 10 is relative to the conveyance of the second. In further embodiments, neither vehicle tows a conveyance, and the first vehicle 10 is controlled such that it is dynamically positioned relative to the second vehicle 14.

Figure 2:
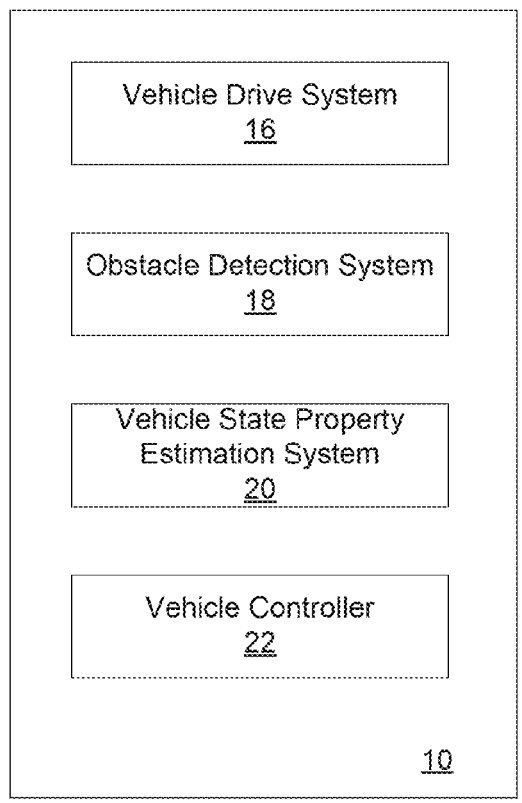
FIG. 2 is a simplified block diagram illustrating components of a first vehicle in accordance with one or more embodiments.

FIG. 2 is a simplified block diagram illustrating components of the automated first vehicle 10 in accordance with one or more embodiments. The first vehicle 10 includes a vehicle drive system 16 or chassis for moving the vehicle. The first vehicle 10 also includes an obstacle detection system 18 including one or more range sensors for detecting obstacles 36 (shown, e.g., in FIG. 4) in the vehicle travel path. The first vehicle 10 also includes a vehicle state property estimation system 20 comprising one or more sensors for estimating state properties of the vehicle. It further includes a microprocessor-based vehicle controller 22, which receives inputs from the obstacle detection system 18 and the vehicle state property estimation system. The vehicle controller 22 also receives data on estimated state properties from the second vehicle 14. The vehicle controller 22 controls operation of the drive system 16 and is programmed to maneuver the vehicle in a desired manner, including dynamically positioning the first vehicle 10 relative to the second vehicle 14.

In various exemplary embodiments described herein, the vehicle controller 22 is physically located within the body of the first vehicle 10. It should be understood, however, that in other embodiments, the vehicle controller 22, or portions of the controller, could be located outside of the first vehicle 10. Such separation of physical location of the electronics and software for controlling the first vehicle 10 is contemplated herein. Moreover, while in the exemplary embodiments discussed herein indicate information is sent to or from the first vehicle 10, that is intended to mean information sent to or from the vehicle controller 22, wherever it may be physically located.

Figure 3:
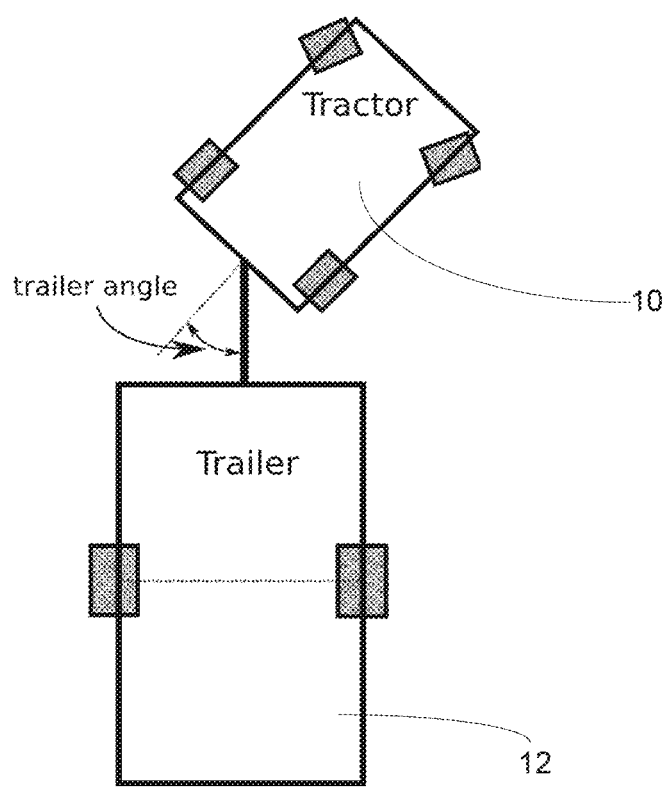
FIG. 3 is a simplified illustration showing the trailer angle between the tractor and a conveyance.

The vehicle state property estimation system 20 in the first vehicle 10 estimates several state properties of the vehicle from one or more sensors. Similarly, the second vehicle 14 includes a vehicle state property estimation system to estimate several state properties of that vehicle. State variables estimated for both vehicles include absolute position in some Earth-relative navigation system (e.g., latitude and longitude), speed, heading, and yaw rate (i.e., rate of change of heading). For the first vehicle 10, the angle between the vehicle 10 and any towed conveyance 12 (e.g., between the tractor 10 and the grain cart 12 as illustrated in FIG. 3) is also estimated.

By way of example, a set of sensors for forward motion comprise a Global Positioning System (GPS) device with Real Time Kinematic (RTK) correction, which provide position and, when a vehicle is in motion, heading. The set of sensors can further include an inertial measurement unit (IMU), which provides measurements of linear acceleration and rotational velocity. The set of sensors can also include sensors for odometry measurements of the tractor's wheels and steering angle. Other combinations of sensors are also possible for forward motion.

To enable reverse motion of a vehicle 10 with a towed conveyance 12 on a hinged hitch, an additional sensor is used, which directly or indirectly measures the angle between the vehicle 10 and the conveyance 12. This additional sensor is used because reverse motion is generally unstable, and dynamic control techniques are performed using the sensor input.

By way of example, the desired state values can be estimated from the sensor data using an Unscented Kalman Filter (UKF), whose inputs are the sensor measurements and whose outputs are the state variables. Other state estimation methods could also be employed.

Both vehicles need not use the same set of sensors. For instance, the harvester 14 could use the global, earth-relative sensors described above, while the tractor 10 could use sensors that directly ascertain its position relative to the harvester 14 in some local reference frame.

Relative positioning is the responsibility of the automatic tractor 10. Thus, the state estimates of the harvester 14 are continuously sent electronically to the tractor 10 to facilitate positioning.

Figure 4:
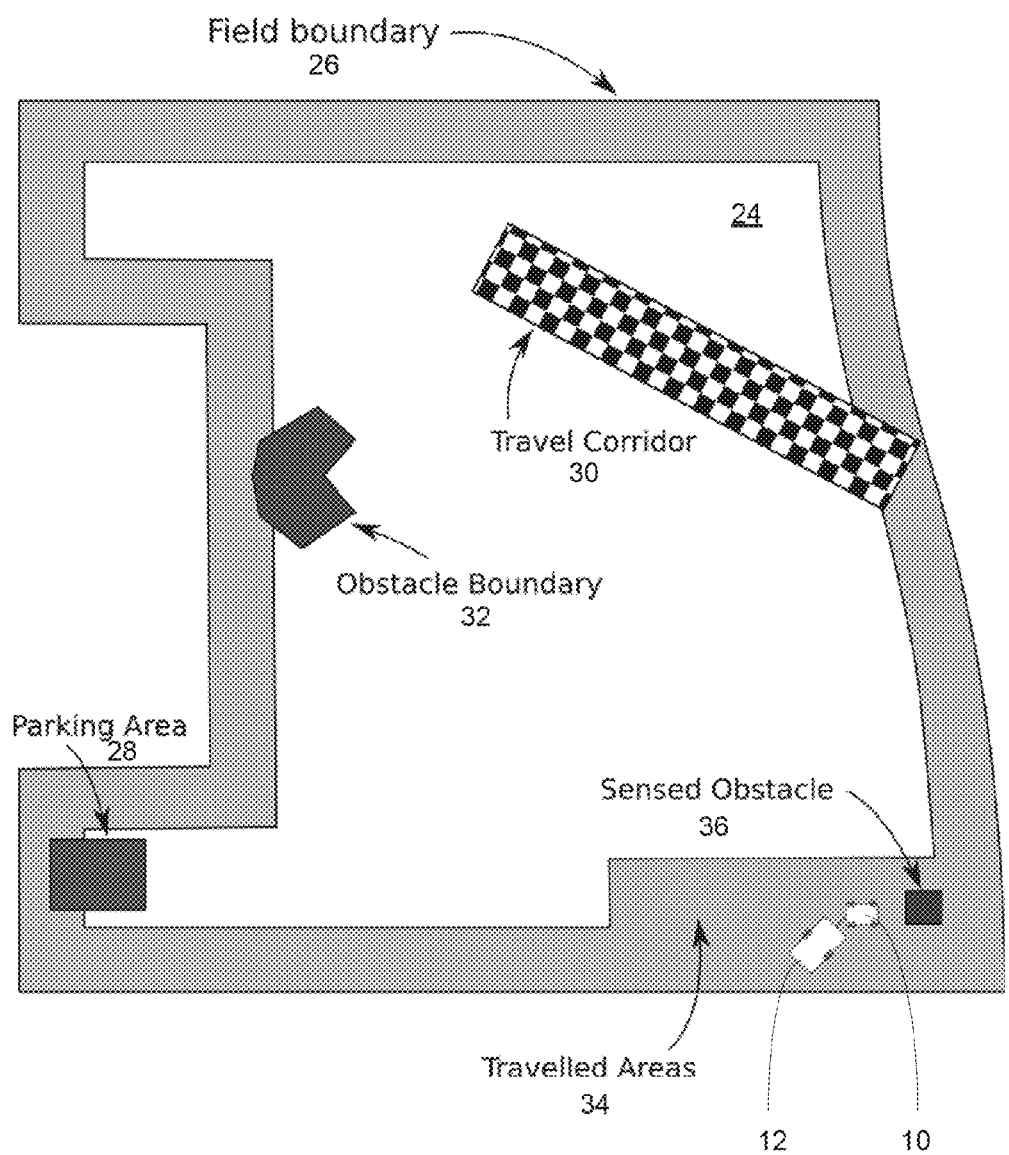
FIG. 4 is a simplified diagram illustrating an exemplary field in which an automated tractor can operate.

FIG. 4 is a simplified illustration of an exemplary field 24, on which the tractor 10 and harvester 14 can operate. The field 24 is defined by a field boundary 26. The field 24 includes legal travel areas within the field boundary 26. The tractor 10 is allowed to travel only in the legal travel areas.

Legal travel areas can include a designated parking area 28. The system operator may designate zero or more geographic regions of arbitrary shape to be parking areas.

Legal travel areas can also include designated travel corridors 30. The system operator can designate zero or more geographic regions of arbitrary shape to be travel corridors.

Legal travel areas can also include previously traveled areas. If the second vehicle 14 travels over an area, that area is by default deemed to be a legal travel area. For instance, a harvester 14 harvests the crop and leaves a cleared area behind it. The harvester 14 regularly transmits newly-cleared path information to the tractor controller 22 so that the tractor 10 has an accurate representation of the harvested areas.

The field boundary 26 can be designated by the system operator as an arbitrary boundary around the operating area. No area outside of that boundary can be a legal travel area.

The system operator can also designate an arbitrary boundary 32 around zero or more obstacles. No area inside any obstacle boundary 32 can be a legal travel area.

The obstacle detection system 18 in the first vehicle allows it to detect unanticipated obstacles 36 in the field 24. While an obstacle 36 is detected, it designates an obstacle boundary 32 around the obstacle. This area within the obstacle boundary 32 is not a legal travel area.

When the second vehicle 14 is a sufficiently long distance away from the first vehicle (e.g., the tractor 10 is in a parking area 28 and the harvester 14 is operating in the field 24), a long-distance path finding procedure can be used to determine a legal path for the first vehicle 10 to follow to be at a desired position relative to the second vehicle 14. A variety of algorithms and processes can be used for such long-distance path finding, including a standard A* or hybrid A* algorithm. The A* algorithms work from a discrete set of moves, i.e., a discrete set of vehicle headings is considered at each step in the process.

The area available for the path planning algorithms to use is determined from both the pre-surveyed paths in the field 24

(e.g., designated parking areas 28, travel corridors 30, field boundaries 26, and obstacle boundaries 32) and area 34 that has been previously travelled by the harvester 14.

The algorithm for checking whether a path lies entirely inside legal travel areas can use a simplified polygon representation of the vehicle and the legal travel areas, and performs intersection-checking of the vehicle polygon with the various areas.

In accordance with one or more embodiments, to reduce the frequency with which the tractor 10 has to "stop to think," it runs a path planning algorithm tuned to run to conclusion quickly, but to give up relatively easily on any path. In order to find a path even in complex terrain, the tractor 10 simultaneously runs a copy of the path planning algorithm tuned to be very aggressive in trying to find a path. This ensures that if the quick path finder above fails, the tractor 10 can eventually think its way out of any solvable situation.

Figure 5:
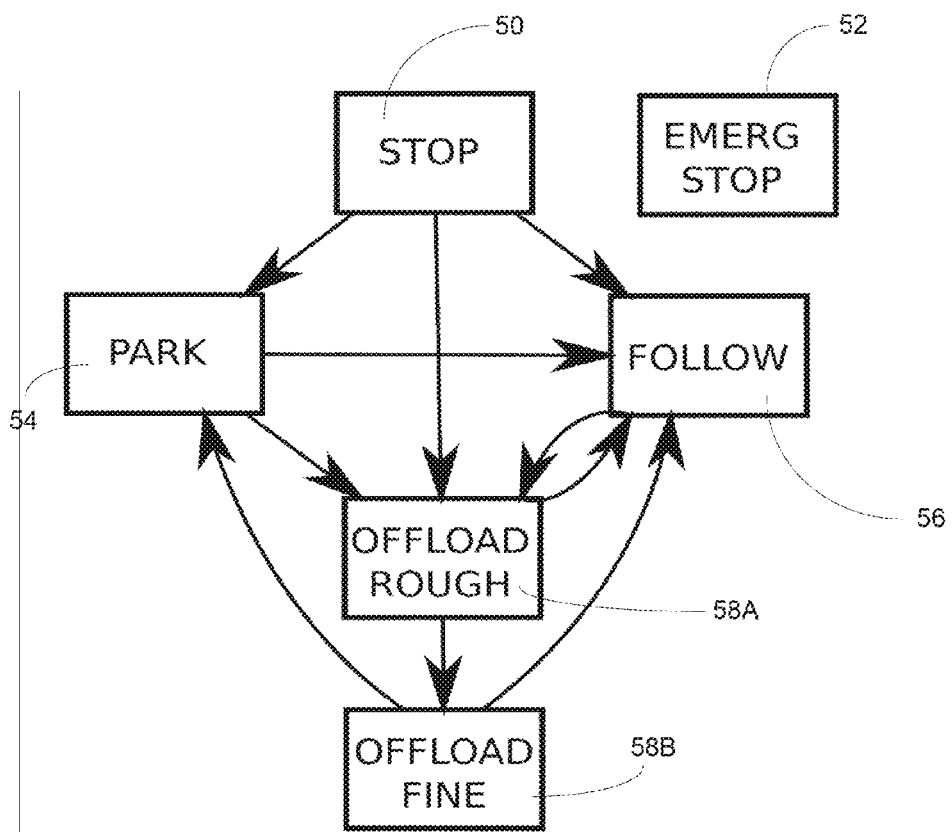
FIG. 5 is a simplified state diagram illustrating various states of the automated vehicle.

The system operator can issue various high-level commands (shown in FIG. 5) to the automatic tractor 10, including STOP 50, EMERGENCY STOP 52, PARK 54, FOLLOW 56, and OFFLOAD 58A, 58B. As shown in FIG. 5, any state can transition to STOP 50 or EMERGENCY STOP 52.

Upon receiving a STOP command 50, the tractor 10 will slow to a halt along its currently planned path. The manner of stopping is intended to be as quick as possible while remaining subjectively comfortable for any human occupant of the tractor 10.

When executing an EMERGENCY STOP operation 52, the tractor 10 will attempt to halt as quickly as possible, e.g., by fully engaging the brakes and fully disengaging the clutch. The manner of stopping is intended to be immediate, without regard to the subjective comfort of any human occupant of the tractor 10.

When executing a PARK operation 54, the tractor 10 will perform long-distance path finding to find a legal path to the designated parking area 28. If a path is found, the tractor 10 will travel using the long-distance path following process. If no path is found, the tractor 10 will perform a STOP operation 50, returning to active motion when a legal PARK path is discovered.

Upon receiving FOLLOW command 56, the tractor 10 will perform a FOLLOW operation to begin following the harvester 14 at a standoff distance. If the harvester 14 is not nearby when the operation starts, the tractor 10 will first transit from its current location to the harvester 14 via legal long-distance travel paths, using the long-distance path following process. If no legal path can be determined, the tractor 10 will begin a STOP operation 50, returning to active motion when a legal FOLLOW path is discovered.

As the harvester 14 moves, the tractor 10 creates new plans to the current harvester position. The plan is made from a point in the tractor's future path. If an updated plan is found successfully, the remainder of the current plan is replaced with the new plan. This update and re-plan procedure continues indefinitely while the tractor 10 is in FOLLOW mode 56.

Upon receiving an OFFLOAD command, the tractor 10 will perform an OFFLOAD operation 58A, 58B to take up a precisely-maintained position relative to the harvester 14 to support offload.

Figure 6:
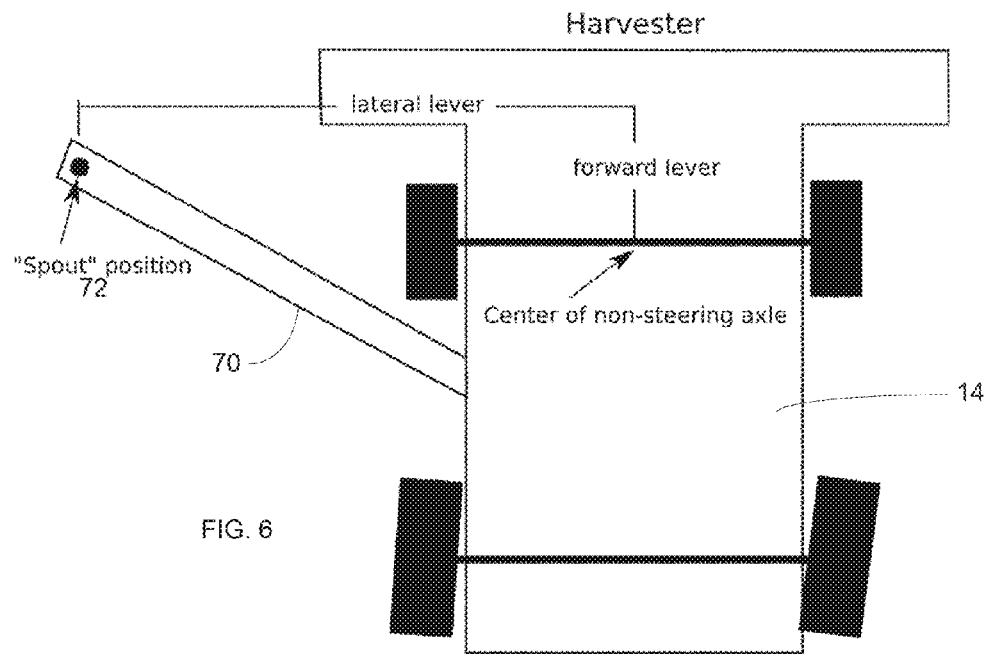
FIG. 6 is a simplified diagram illustrating a harvester.

The harvester 14 can include a lever arm with an offload spout 70 (shown in FIG. 6) for offloading material to the grain cart 12. The system operator identifies a position relative to the harvester 14, called the "lever arm position" or "spout position" 72 (shown in FIG. 6), and a position relative to the grain cart 12, called the "load position" 74 (shown in FIG. 7). During the OFFLOAD operation, the system endeavors to keep the two positions co-located.

The OFFLOAD process is comprised of two major steps. In the first step, ROUGH POSITIONING 58A, the automatic tractor 10 tows the trailer 12 into a "roughly correct" position using the long-distance path finding and long-distance path following processes to get progressively near the harvester 14. If the tractor 10 cannot determine a legal path to an offload position, or if the tractor 10 is already in offload position, but the current legal path "dead ends," it will perform a FOLLOW operation 56 until such time as a legal offload path can be found.

The second step, FINE POSITIONING 58B, begins once the trailer 12 is in approximately the correct position, to bring it to the desired position, and to maintain that position, with the required accuracy. In this mode, the tractor 10 uses the state information received from the harvester 14 to estimate the arc that the lever arm position will trace out, assuming that the current harvester yaw rate remains constant. A standard control algorithm known as "pure pursuit" can be used to determine the path that the grain cart should traverse in order to keep the load position 74 co-located with the spout position 72.

Figure 8:
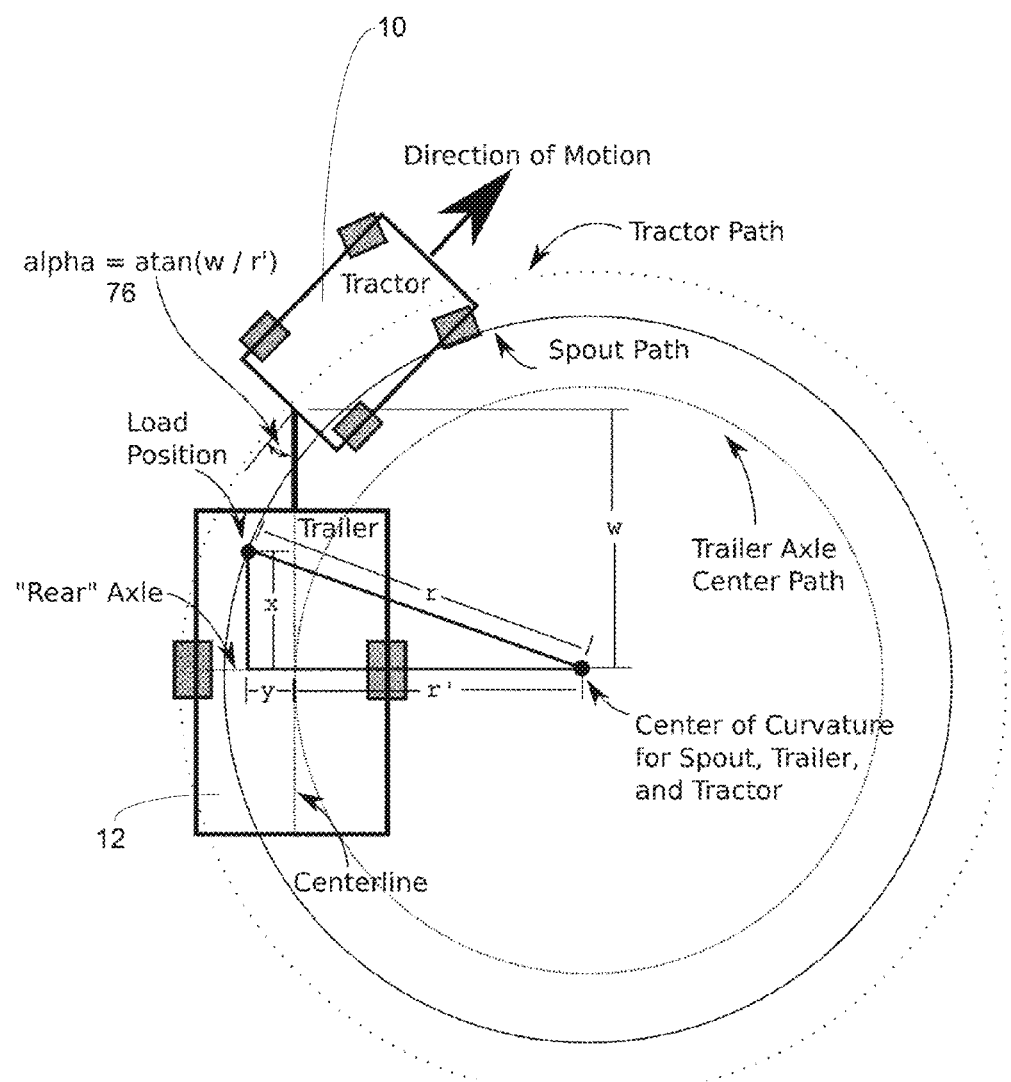
FIG. 8 is a simplified diagram illustrating calculation of a tractor path in accordance with one or more embodiments.

Given the grain cart's required path and current position, the angle alpha between the automatic tractor 10 and the grain cart 12 can be determined given simple models of each element. The automatic vehicle 10 is then steered to create the desired "alpha" 76 as shown in FIG. 8 using a standard PID controller integrated into the vehicle controller 22.

The harvester vehicle 14 may support more than one lever arm position. For example, a harvester 14 may support offloading to the right or to the left sides.

Figure 7:
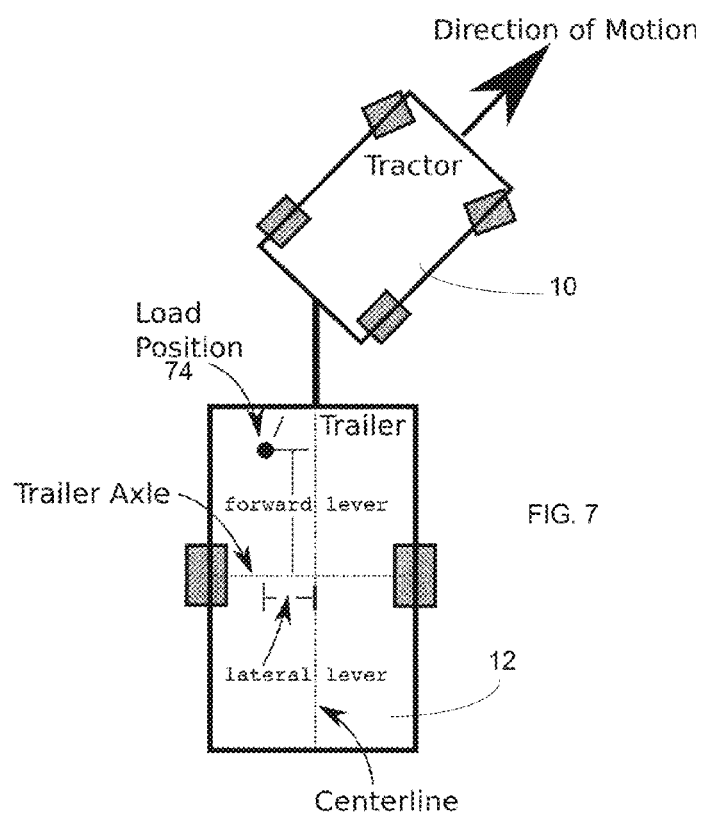
FIG. 7 is a simplified diagram illustrating varying load positions in a conveyance.

The load position 74 can be deliberately varied (as shown in FIG. 7) during operation, e.g., in order to maintain even fill of a grain cart 12. The system operator may manually adjust the load position 74 during operations. The load position 74 may also optionally be set to automatically cycle from the front of the grain cart to the back. Furthermore, the use of sensors such as load sensors or content-height sensors affixed to the grain cart at various points can be used to automatically guide the loading position 74 along the axis of the grain cart 12 to provide more even loading.

Bimodal Control System for Adjusting Load Position

In accordance with one or more further embodiments, a bimodal control system is provided, enabling the load position 74 in the cart to be varied. The bimodal control system is implemented in an offload control module (OCM) in the vehicle controller 22 of the first vehicle 10.

Figure 9:
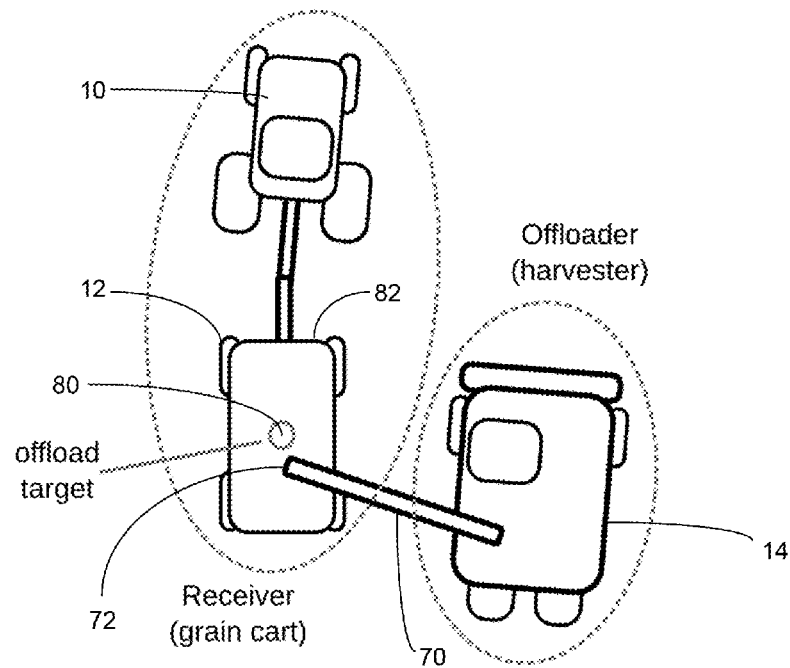
FIG. 9 is a simplified illustration showing an exemplary combine harvester offloading grain on a grain cart in accordance with one or more embodiments.

As discussed above, the autonomous first vehicle 10 is designed to navigate and maneuver to the second vehicle 14 in order to establish a specific spatial relationship between the two vehicles while the vehicles are in motion. This is referred to as the "tracking" mode in the bimodal control process. In the grain harvesting example shown in FIG. 9, the tractor 10 attempts to center its grain cart 12 under the combine's offloading spout 70. The center of the cart is typically the offload target 80. The outer perimeter of the cart indicated by reference number 82 defines the open area of the cart.

Often the Offloader operator wants to exert some limited manual control over the relative position of the spout position 72 of the offloading spout 70 to the grain cart. The operator in the combine example may want to adjust the position of the spout 70 over the grain cart 12 by moving the spout position 72 off-center (i.e., away from the offload target 80) in order temper the distribution of the grain load in the cart 12.

The bimodal control system in accordance with one or more embodiments provides a physically intuitive mechanism to help the Offloader operator perform such adjustment while the Offloader continues with its primary task. When the system is activated in a "fixed-speed" mode as discussed below, the Offloader operator can adjust the position of the spout by simply adjusting the forward driving speed of the Offloader vehicle 14.

The bimodal control system operates in conjunction with other systems controlling the transverse position (in a direction transverse to the direction of motion of the vehicles) of the Receiver 10 with respect to the Offloader 14.

Although various exemplary embodiments disclosed herein refer to the grain cart and combine harvester example, it should be understood that there are many other possible applications for the methods and systems described herein, including agricultural and non-agricultural applications. Other possible applications can include, but are not limited to, mining, oil and gas exploration, defense, emergency response, and other domains.

Figure 10:
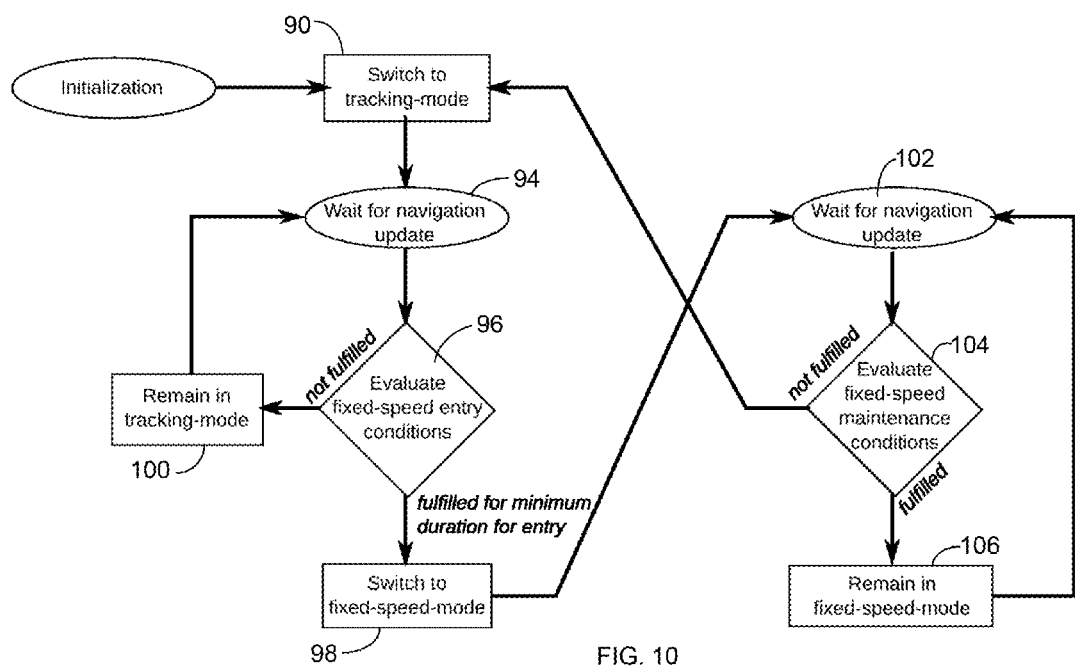
FIG. 10 is a flowchart illustrating an exemplary process for switching between a tracking mode and a fixed-speed mode in accordance with one or more embodiments.

FIG. 10 is a flow chart illustrating exemplary operation of a bimodal control system in accordance with one or more embodiments.

When the Receiver is commanded to receive material from the Offloader, the OCM of the Receiver first enters a tracking mode at step 90, which causes the Receiver vehicle to progressively maneuver towards a desired given position relative to the Offloader as previously discussed. The OCM actively tracks the Offloader's position in two dimensions, namely the direction of motion of the Offloader and a direction perpendicular to the direction of motion.

The OCM periodically receives navigation updates at step 94, which it uses to evaluate tracking success. The navigation updates can be obtained from the state property estimation systems of the Offloader and Receiver vehicles, as previously discussed.

Once the Receiver has fulfilled a certain set of conditions indicating tracking success (the fixed-speed entry conditions) at step 96, the OCM switches to the fixed-speed mode at step 98, in which the Receiver continues to track the Offloader in the transverse direction (perpendicular to direction of forward motion) while its forward drive speed becomes fixed. If the fixed-speed entry conditions have not been met at step 96, the OCM remains in a tracking mode at step 100 until the fixed-speed entry conditions are met.

Once in the fixed-speed mode, the Offloader operator can adjust the relative position of the two vehicles by simply adjusting the speed of the Offloader vehicle.

The OCM periodically receives navigation updates at step 102 while in fixed-speed mode, which it uses to determine if the relative position of the two vehicles violates a second set of conditions (the maintenance conditions) at step 104. If the OCM determines that the conditions are violated, indicating imminent tracking failure, then the OCM switches back to tracking mode at 90 to actively reestablish the baseline relative position in two dimensions. The OCM maintains the fixed-speed mode at 106 if the maintenance conditions are not violated.

Parameters

Figure 11:
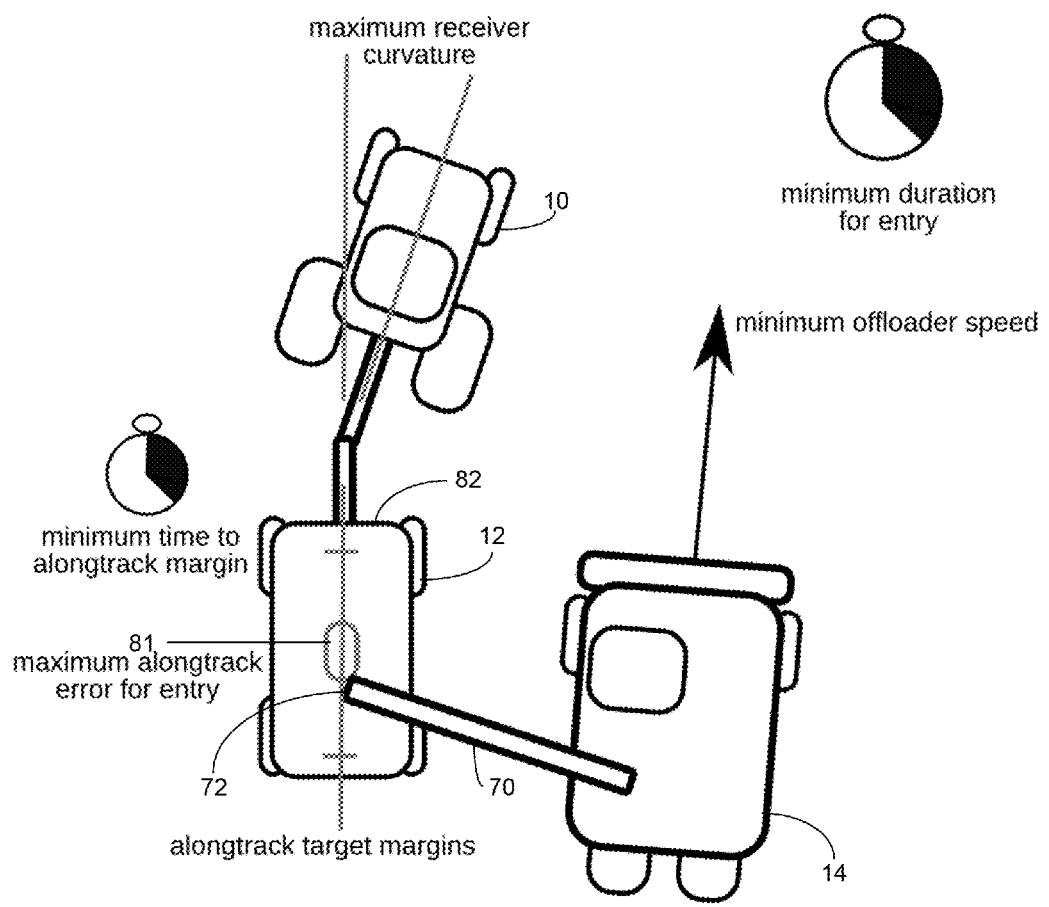
FIG. 11 is a simplified illustration showing parameters for switching into and maintaining a fixed-speed mode in accordance with one or more embodiments.

In accordance with one or more embodiments, fixed-speed offload can be configured with various parameters as depicted in FIG. 11. The "alongtrack" error refers to the deviation from the offload target position 80 along the direction of motion of the Receiver. The speed history is a record of Receiver speed values, as described in further detail below.

alongtrack target margins: maximum allowed alongtrack error values (usually constrained by the available capture surface of the Receiver, i.e., the open area 82 of the grain cart 12)
   minimum offloader speed: minimum required speed of the Offloader vehicle
   maximum receiver curvature (optional): if the Receiver includes a towed vehicle, the maximum curvature (as reflected in the angle of the tow linkage).
   maximum alongtrack error for entry: maximum allowed alongtrack error before entering fixed-speed mode (represented by the elongated target area 81 in FIG. 11)
   maximum speed change for entry: maximum allowed range of Receiver speeds recorded in the speed history
   minimum duration for entry: minimum duration for which the entry conditions must be maintained before switching to fixed-speed mode
   minimum time to alongtrack margin for exit: minimum allowed time until the alongtrack error reaches a margin Tracking Mode In the tracking mode, the OCM controls both the speed and steering of the Receiver vehicle in order to maneuver to and maintain a given position relative to the (still moving) Offloader vehicle.

While in the tracking mode, the OCM maintains a history of the speed of the Receiver's offload target point. The history is time-based; the target's current speed is added to the sample set at every navigation update, and any samples older than the minimum duration for entry are removed.

Transition to Fixed-Speed Mode

In accordance with one or more embodiments, several conditions should be met before the OCM can switch into the fixed speed mode:

The Receiver longitudinal position should lie within the maximum alongtrack error for entry margin of target position.
   If the Receiver is a towed vehicle, the effective curvature should be less than maximum receiver curvature. (This ensures that the tow linkage is not too kinked.)
   The Offloader should be travelling at least a minimum offloader speed.
   The Offload target speed history record should be non-empty.
   The difference between the minimum and maximum samples in the speed history record should be below maximum speed change for entry. (This ensures that the vehicles have similar speeds and that the Receiver is not rushing to catch up to Offloader.)

These conditions should be maintained for minimum duration for entry (typically, 2 seconds) before transition to fixed speed mode. This provides a degree of hysteresis, ensuring that the OCM has achieved a reliable target lock before ceding control of the alongtrack axis to the Offloader operator. These conditions are evaluated upon every navigation update to the system.

If all these conditions are met, the specific fixed speed is calculated as the mean of all the samples recorded in the speed history record and the OCM switches to fixed speed mode.

Fixed-Speed Mode

In the fixed speed mode, the OCM to continues control the steering of the Receiver vehicle as in tracking mode. However, the Receiver's vehicle speed is kept constant at the specific fixed speed.

Transition Back to Tracking Mode

In accordance with one or more embodiments, to remain in fixed speed mode, the following conditions should be maintained continuously:

The Receiver longitudinal position should lie within the alongtrack target margins of target position. (This ensures that the Receiver is generally on target, e.g., the grain cart is so not so far from the combine spout that grain is being dumped on the ground.)

The estimated time until the target position does exceed the alongtrack target margins should be greater than the minimum time to alongtrack margin for exit (typically three seconds). (This ensures that the OCM will have sufficient time to correct the longitudinal error if it must switch back to tracking mode.)

If the Receiver is a towed vehicle, the effective curvature must be less than maximum receiver curvature. (This ensures that the tow linkage is not too kinked.)

The Offloader should be travelling at least minimum offloader speed.

These conditions are evaluated upon every navigation update to the system, and if any one of these conditions are not met at any given update, the OCM switches back to tracking mode.

When switching back to tracking mode, the speed history record is cleared.

The processes of the vehicle controller 22 described above may be implemented in software, hardware, firmware, or any combination thereof. The processes are preferably implemented in one or more computer programs executing on the vehicle controller 22. Each computer program can be a set of instructions (program code) in a code module resident in the random access memory of the controller 22. Until required by the controller 22, the set of instructions may be stored in another computer memory (e.g., in a hard disk drive, or in a removable memory such as an optical disk, external hard drive, memory card, or flash drive) or stored on another computer system and downloaded via the Internet or other network.

Having thus described several illustrative embodiments, it is to be appreciated that various alterations, modifications, and improvements will readily occur to those skilled in the art. Such alterations, modifications, and improvements are intended to form a part of this disclosure, and are intended to be within the spirit and scope of this disclosure. While some examples presented herein involve specific combinations of functions or structural elements, it should be understood that those functions and elements may be combined in other ways according to the present disclosure to accomplish the same or different objectives. In particular, acts, elements, and features discussed in connection with one embodiment are not intended to be excluded from similar or other roles in other embodiments. Additionally, elements and components described herein may be further divided into additional components or joined together to form fewer components for performing the same functions.

Accordingly, the foregoing description and attached drawings are by way of example only, and are not intended to be limiting.

What is claimed is:

1. A computer-implemented method for automatically positioning a moving first vehicle relative to a moving second vehicle traveling in a given area, the method comprising the steps of:
   (a) automatically tracking the second vehicle in a tracking mode and guiding the first vehicle to attain a given position relative to the second vehicle; and
   (b) once the first vehicle has attained the given position relative to the second vehicle in the tracking mode, automatically controlling the first vehicle in a fixed-speed mode to maintain a generally constant speed such that an operator of the second vehicle can manually adjust the speed of the second vehicle to correspondingly adjust a relative position of the second vehicle to the first vehicle in a direction of movement of the first and second vehicles, while automatically controlling the first vehicle to maintain a given distance from the second vehicle in a direction generally perpendicular to the direction of movement of the first and second vehicles by tracking the second vehicle.

2. The method of claim 1, wherein the second vehicle comprises an offloader, and the first vehicle comprises a receiver, wherein the receiver receives material from the offloader during step (b) in an on-the-fly offloading operation.

3. The method of claim 2, wherein the first vehicle comprises a grain cart, and the second vehicle comprises a harvester.

4. The method of claim 1, wherein the first vehicle includes a towed conveyance, and the second vehicle includes an offload spout for transferring material from the second vehicle to the towed conveyance.

5. The method of claim 4, wherein adjusting a relative position of the second vehicle to the first vehicle in the direction of movement of the first and second vehicles enables the operator of the second vehicle to adjust the position of the offload spout relative to the towed conveyance for improved distribution of transferred material in the towed conveyance.

6. The method of claim 1, wherein the first vehicle is an autonomous vehicle, and the second vehicle is an autonomous vehicle or a manually operated vehicle.

7. The method of claim 1, further comprising, prior to step (b), determining whether one or more tracking conditions have been met for a given period of time.

8. The method of claim 7, wherein the one or more conditions comprise a condition specifying that the first vehicle has a longitudinal position within a given margin relative to a target position in the second vehicle.

9. The method of claim 7, wherein the first vehicle includes a towed conveyance, and wherein the one or more conditions comprise a condition specifying that an effective curvature defined by the towed conveyance is less than a given maximum curvature.

10. The method of claim 7, wherein the one or more conditions comprise a condition specifying that the second vehicle must be traveling at a given minimum speed.

11. The method of claim 7, wherein the one or more conditions comprise a condition specifying that an offload target speed history record is non-empty.

12. The method of claim 11, wherein the one or more conditions comprise a condition specifying that the difference between minimum and maximum samples in the speed history record is below a given maximum value.

13. The method of claim 1, further comprising, during step (b), determining whether one or more conditions are being met and, if not, reverting to step (a).

14. The method of claim 13, wherein the one or more conditions comprise a condition specifying that the first vehicle has a longitudinal position within a given margin relative to a target position in the second vehicle.

15. The method of claim 14, wherein the one or more conditions comprise a condition specifying that an estimated time until a target position on the first vehicle exceeds an alongtrack target margin must exceed a minimum time period.

16. The method of claim 13, wherein the first vehicle includes a towed conveyance, and wherein the one or more conditions comprise a condition specifying that an effective curvature defined by the towed conveyance is less than a given maximum curvature.

17. The method of claim 13, wherein the one or more conditions comprise a condition specifying that the second vehicle is traveling at a minimum speed.

18. The method of claim 1, wherein step (a) is performed by:
  (i) receiving location data on the first and second vehicles;
  (ii) determining a legal travel path for the first vehicle in the given area from the first vehicle toward an expected position of the second vehicle;
  (iii) automatically controlling the first vehicle to travel along the legal travel path; and
  (iv) repeating steps (i) through (iii) to automatically move the first vehicle progressively closer to the second vehicle until the first vehicle is at a given relative position from the second vehicle and then to automatically maintain the given relative position as the first and second vehicles travel through the given area.

19. A first vehicle configured to be automatically positioned relative to a moving second vehicle traveling in a given area, the first vehicle comprising:
  (a) a vehicle drive system;
  (b) a vehicle state property estimation system for estimating state properties of the first vehicle; and
  (c) a microprocessor-based vehicle controller receiving data from the vehicle state property estimation system and controlling the vehicle drive system, the vehicle controller being configured to:
    (i) automatically track the second vehicle in a tracking mode and control the vehicle drive system to guide the first vehicle to attain a given position relative to the second vehicle; and
    (ii) once the first vehicle has attained the given position relative to the second vehicle in the tracking mode, automatically control the vehicle drive system to maintain a generally constant speed for the first vehicle such that an operator of the second vehicle can manually adjust the speed of the second vehicle to correspondingly adjust a relative position of the second vehicle to the first vehicle in a direction of movement of the first and second vehicles, and automatically control the vehicle drive system such that the first vehicle maintains a given distance from the second vehicle in a direction generally perpendicular to the direction of movement of the first and second vehicles by tracking the second vehicle.

20. The first vehicle of claim 19, wherein the second vehicle comprises an offloader, and the first vehicle comprises a receiver, wherein the receiver receives material from the offloader during (ii) in an on-the-fly offloading operation.

21. The first vehicle of claim 20, wherein the first vehicle comprises a grain cart, and the second vehicle comprises a harvester.

22. The first vehicle of claim 19, wherein the first vehicle includes a towed conveyance, and the second vehicle includes an offload spout for transferring material from the second vehicle to the towed conveyance.

23. The first vehicle of claim 22, wherein adjusting a relative position of the second vehicle to the first vehicle in the direction of movement of the first and second vehicles enables the operator of the second vehicle to adjust the position of the offload spout relative to the towed conveyance for improved distribution of transferred material in the towed conveyance.

24. The first vehicle of claim 19, wherein the first vehicle is an autonomous vehicle, and the second vehicle is an autonomous vehicle or a manually operated vehicle.

25. The first vehicle of claim 19, wherein the vehicle controller is further configured to, prior to (ii), determine whether one or more tracking conditions have been met for a given period of time.

26. The first vehicle of claim 25, wherein the one or more conditions comprise a condition specifying that the first vehicle has a longitudinal position within a given margin relative to a target position in the second vehicle.

27. The first vehicle of claim 25, wherein the first vehicle includes a towed conveyance, and wherein the one or more conditions comprise a condition specifying that an effective curvature defined by the towed conveyance is less than a given maximum curvature.

28. The first vehicle of claim 25, wherein the one or more conditions comprise a condition specifying that the second vehicle must be traveling at a given minimum speed.

29. The first vehicle of claim 25, wherein the one or more conditions comprise a condition specifying that an offload target speed history record is non-empty.

30. The first vehicle of claim 29, wherein the one or more conditions comprise a condition specifying that the difference between minimum and maximum samples in the speed history record is below a given maximum value.

31. The first vehicle of claim 19, wherein the vehicle controller is further configured to, during (ii), determine whether one or more conditions are being met and, if not, reverting to (i).

32. The first vehicle of claim 31, wherein the one or more conditions comprise a condition specifying that the first vehicle has a longitudinal position within a given margin relative to a target position in the second vehicle.

33. The first vehicle of claim 32, wherein the one or more conditions comprise a condition specifying that an estimated time until a target position on the first vehicle exceeds an alongtrack target margin must exceed a minimum time period.

34. The first vehicle of claim 31, wherein the first vehicle includes a towed conveyance, and wherein the one or more conditions comprise a condition specifying that an effective curvature defined by the towed conveyance is less than a given maximum curvature.

35. The first vehicle of claim 31, wherein the one or more conditions comprise a condition specifying that the second vehicle is traveling at a minimum speed.

36. The first vehicle of claim 19, wherein the vehicle controller is configured to perform (i) by:
  (A) receiving location data on the first and second vehicles;
  (B) determining a legal travel path for the first vehicle in the given area from the first vehicle toward an expected position of the second vehicle;
  (C) automatically controlling the first vehicle to travel along the legal travel path; and
  (D) repeating steps (A) through (C) to automatically move the first vehicle progressively closer to the second vehicle until the first vehicle is at a given relative position from the second vehicle and then to automatically maintain the given relative position as the first and second vehicles travel through the given area.

* * * * *